United States Patent
Cruz-Hernandez et al.

(10) Patent No.: US 9,874,935 B2
(45) Date of Patent: Jan. 23, 2018

(54) SYSTEMS AND METHODS FOR A TEXTURE ENGINE

(75) Inventors: Juan Manuel Cruz-Hernandez, Montreal (CA); Danny A. Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 291 days.

(21) Appl. No.: 12/697,010

(22) Filed: Jan. 29, 2010

(65) Prior Publication Data

US 2010/0231540 A1    Sep. 16, 2010

Related U.S. Application Data

(60) Provisional application No. 61/159,482, filed on Mar. 12, 2009, provisional application No. 61/262,041, filed on Nov. 17, 2009, provisional application No. 61/262,038, filed on Nov. 17, 2009.

(51) Int. Cl.
  *G06F 3/01*     (2006.01)
  *G06F 3/0488*   (2013.01)
  *G08B 6/00*     (2006.01)

(52) U.S. Cl.
  CPC ........... *G06F 3/016* (2013.01); *G06F 3/017* (2013.01); *G06F 3/0488* (2013.01); *G06F 2203/014* (2013.01); *G08B 6/00* (2013.01)

(58) Field of Classification Search
  None
  See application file for complete search history.

(56) References Cited

U.S. PATENT DOCUMENTS

| | | | |
|---|---|---|---|
| 5,144,187 A | 9/1992 | Culp | |
| 5,198,732 A | 3/1993 | Morimoto | |
| 5,691,898 A | 11/1997 | Rosenberg et al. | |
| 5,709,219 A | 1/1998 | Chen et al. | |
| 5,734,373 A | 3/1998 | Rosenberg et al. | |
| 5,767,839 A | 6/1998 | Rosenberg | |
| 5,844,392 A | 12/1998 | Peurach et al. | |
| 5,939,816 A | 8/1999 | Culp | |
| 5,952,806 A | 9/1999 | Muramatsu | |

(Continued)

FOREIGN PATENT DOCUMENTS

| | | |
|---|---|---|
| CN | 1646833 | 7/2005 |
| EP | 0899 650 | 3/1999 |

(Continued)

OTHER PUBLICATIONS

Corel Paint Shop Pro Photo X2 Reviewer's Guide, accessed Apr. 7, 2012, published prior to Nov. 2, 2007, http://web.archive.org/web/20071102133023/http://www.corel.com/content/vpk/psppx2/PSPPX2_Reviewer_Guide.pdf.*

(Continued)

*Primary Examiner* — Benyam Haile
(74) *Attorney, Agent, or Firm* — Kilpatrick Townsend & Stockton LLP (57) ABSTRACT

Systems and methods for a texture engine are disclosed. For example, one disclosed system includes: a processor configured to receive a display signal including a plurality of pixels, determine a haptic effect comprising a texture, and transmit a haptic signal associated with the haptic effect to an actuator in communication with the processor, the actuator configured to receive the haptic signal and output the haptic effect.

20 Claims, 5 Drawing Sheets

(56) References Cited

U.S. PATENT DOCUMENTS

| | | | |
|---|---|---|---|
| 5,956,484 A | 9/1999 | Rosenberg et al. | |
| 5,959,613 A | 9/1999 | Rosenberg et al. | |
| 6,028,593 A | 2/2000 | Rosenberg et al. | |
| 6,046,527 A | 4/2000 | Roopnarine | |
| 6,046,730 A | 4/2000 | Bowen et al. | |
| 6,084,587 A | 7/2000 | Tarr et al. | |
| 6,088,019 A | 7/2000 | Rosenberg | |
| 6,131,097 A | 10/2000 | Peurach et al. | |
| 6,147,674 A | 11/2000 | Rosenberg et al. | |
| 6,169,540 B1 | 1/2001 | Rosenberg et al. | |
| 6,219,032 B1 | 4/2001 | Rosenberg | |
| 6,252,579 B1 | 6/2001 | Rosenberg | |
| 6,285,351 B1 | 9/2001 | Chang et al. | |
| 6,292,170 B1 | 9/2001 | Chang et al. | |
| 6,433,711 B1 | 3/2002 | Chen | |
| 6,429,846 B2 * | 8/2002 | Rosenberg | A63F 13/06 345/156 |
| 6,697,086 B2 | 2/2004 | Rosenberg et al. | |
| 6,703,924 B2 | 3/2004 | Tecu et al. | |
| 6,850,222 B1 | 2/2005 | Rosenberg | |
| 6,859,819 B1 | 2/2005 | Rosenberg et al. | |
| 7,027,032 B2 | 4/2006 | Rosenberg et al. | |
| 7,109,967 B2 | 9/2006 | Hioki et al. | |
| 7,148,875 B2 | 12/2006 | Rosenberg et al. | |
| 7,812,828 B2 | 10/2010 | Westerman et al. | |
| 7,815,436 B2 | 10/2010 | Cunningham et al. | |
| 7,843,438 B2 | 11/2010 | Onoda | |
| 7,920,124 B2 | 4/2011 | Tokita et al. | |
| 8,210,942 B2 | 7/2012 | Shimabukuro et al. | |
| 8,264,465 B2 | 9/2012 | Grant et al. | |
| 8,494,860 B2 | 7/2013 | Asakawa et al. | |
| 8,677,274 B2 | 3/2014 | Runov et al. | |
| 2001/0035854 A1 | 11/2001 | Rosenberg et al. | |
| 2002/0177471 A1 | 11/2002 | Kaaresoja et al. | |
| 2003/0063128 A1 | 4/2003 | Salminaa et al. | |
| 2003/0117490 A1 | 6/2003 | Tecu | |
| 2003/0184518 A1 | 10/2003 | Numata et al. | |
| 2003/0234768 A1 | 12/2003 | Rekimoto et al. | |
| 2004/0107407 A1 | 6/2004 | Henson et al. | |
| 2004/0169674 A1 | 9/2004 | Linjama | |
| 2004/0218910 A1 | 11/2004 | Chang et al. | |
| 2004/0233162 A1 | 11/2004 | Kobayashi | |
| 2005/0017947 A1 * | 1/2005 | Shahoian et al. | 345/156 |
| 2005/0030292 A1 | 2/2005 | Diederiks | |
| 2005/0057528 A1 | 3/2005 | Kleen | |
| 2006/0024647 A1 | 2/2006 | Chesnais et al. | |
| 2006/0046031 A1 | 3/2006 | Janevski | |
| 2006/0061545 A1 | 3/2006 | Hughes et al. | |
| 2006/0061558 A1 | 3/2006 | Grant et al. | |
| 2006/0119573 A1 | 6/2006 | Grant et al. | |
| 2006/0119586 A1 | 6/2006 | Grant et al. | |
| 2006/0181510 A1 | 8/2006 | Faith | |
| 2006/0209037 A1 | 9/2006 | Wang et al. | |
| 2006/0226298 A1 * | 10/2006 | Pierson | A63H 30/04 246/1 R |
| 2006/0267416 A1 | 11/2006 | Suzuki | |
| 2006/0290662 A1 | 12/2006 | Houston et al. | |
| 2007/0021961 A1 | 1/2007 | Oh | |
| 2007/0066283 A1 | 3/2007 | Haar et al. | |
| 2007/0236450 A1 * | 10/2007 | Colgate | G06F 3/016 345/156 |
| 2007/0236474 A1 | 10/2007 | Ramstein | |
| 2007/0279401 A1 | 12/2007 | Ramstein et al. | |
| 2007/0290988 A1 | 12/2007 | Nogami et al. | |
| 2008/0048974 A1 | 2/2008 | Braun et al. | |
| 2008/0068348 A1 | 3/2008 | Rosenberg et al. | |
| 2008/0068648 A1 | 3/2008 | Benz et al. | |
| 2008/0122589 A1 | 5/2008 | Ivanov | |
| 2008/0216578 A1 | 9/2008 | Takashima et al. | |
| 2009/0102805 A1 | 4/2009 | Meijer et al. | |
| 2009/0112572 A1 | 4/2009 | Thorn | |
| 2009/0134744 A1 | 5/2009 | Yoon et al. | |
| 2009/0167701 A1 | 7/2009 | Ronkainen | |
| 2009/0207129 A1 | 8/2009 | Ullrich et al. | |
| 2009/0227296 A1 * | 9/2009 | Kim | G06F 3/016 455/566 |
| 2009/0284485 A1 | 11/2009 | Colgate et al. | |
| 2010/0020036 A1 | 1/2010 | Hui et al. | |
| 2010/0026976 A1 | 2/2010 | Meehan et al. | |
| 2010/0073304 A1 | 3/2010 | Grant et al. | |
| 2010/0108408 A1 | 5/2010 | Colgate et al. | |
| 2010/0231539 A1 | 9/2010 | Cruz-Hernandez et al. | |
| 2010/0315212 A1 * | 12/2010 | Radivojevic | G06F 3/016 340/407.2 |
| 2011/0115709 A1 | 5/2011 | Cruz-Hernandez | |
| 2011/0248817 A1 | 10/2011 | Houston et al. | |
| 2012/0232780 A1 | 9/2012 | Delson | |

FOREIGN PATENT DOCUMENTS

| | | |
|---|---|---|
| EP | 1 401 185 | 3/2004 |
| EP | 1 731 993 | 12/2006 |
| EP | 1748350 | 1/2007 |
| GB | 2 416 962 | 2/2006 |
| JP | 11-212725 | 8/1999 |
| JP | 2001-290572 | 10/2001 |
| JP | 2001-290572 A | 10/2001 |
| JP | 2003-099177 A | 4/2003 |
| JP | 2004-265281 | 9/2004 |
| JP | 2004-310518 | 11/2004 |
| JP | 2004-310518 A | 11/2004 |
| JP | 2005-258666 | 9/2005 |
| JP | 2006-228151 | 8/2006 |
| JP | 2009-003867 | 1/2009 |
| KR | 2009-0024006 | 3/2009 |
| WO | WO 2001/054109 | 7/2001 |
| WO | WO 2002/073587 | 9/2002 |
| WO | WO 2004/044728 | 5/2004 |
| WO | WO 2004/051451 | 6/2004 |
| WO | WO 2004/075169 | 9/2004 |
| WO | WO 2005/103863 | 11/2005 |
| WO | WO 2006/042309 | 4/2006 |
| WO | WO 2007/120562 | 10/2007 |
| WO | WO 2007117418 | 10/2007 |
| WO | WO 2008/037275 | 4/2008 |
| WO | WO 2008/042745 | 4/2008 |
| WO | WO 2008/103535 | 8/2008 |
| WO | WO 2008/132540 | 11/2008 |
| WO | WO 2008/144108 | 11/2008 |
| WO | WO 2009/002605 | 12/2008 |
| WO | WO 2009/026337 | 2/2009 |
| WO | WO 2009/074185 | 6/2009 |
| WO | WO 2009/097866 | 8/2009 |

OTHER PUBLICATIONS

International Preliminary Report on Patentability dated Sep. 22, 2011 for corresponding International Application No. PCT/US2010/026909.

International Preliminary Report on Patentability dated Sep. 22, 2011 for corresponding International Application No. PCT/US2010/026897.

International Preliminary Report on Patentability dated Sep. 22, 2011 for corresponding International Application No. PCT/US2010/026905.

International Preliminary Report on Patentability dated Sep. 22, 2011 for corresponding International Application No. PCT/US2010/026894.

International Preliminary Report on Patentability dated Sep. 22, 2011 for corresponding International Application No. PCT/US2010/026907.

International Preliminary Report on Patentability dated Sep. 22, 2011 for corresponding International Application No. PCT/US2010/026900.

Biet, M. et al., "Discrimination of Virtual Square Gratings by Dynamic Touch on Friction Based Tactile Displays," Haptic Interfaces for Virtual Environment and Teleoperator Systems, 2008, Symposium, IEEE, Piscataway, NJ, XP 031339918, pp. 41-48, Mar. 2008.

(56) References Cited

OTHER PUBLICATIONS

De Witt, A., "Designing Sonification of User Data in Affective Interaction," Master of Science Thesis Stockholm, Sweden, XP 002551466, at hppt://w3.nada.kth.se/utbildning/grukth/exjobb/rapportlistor/2007/de_witt_anna_07142, as available via the Internet and printed Oct. 20, 2009.
Kaaresoja, T. et al., "Snap-Crackle-Pop: Tactile Feedback for Mobile Touch Screens," Proceedings of the Eurohaptics 2006, XP 002551465, at http://lsc.univ-evry.fr/(eurohaptics/upload/cd/papers/f80, as available via the Internet and printed Oct. 20, 2009.
Maeno, T. et al., "Tactile Display of Surface Texture by use of Amplitude Modulation of Ultrasonic Vibration," IEEE Ultrasonics Symposium, 2006, pp. 62-65.
Minsky, Margaret Diane Rezvan, "Computational Haptics: The Sandpaper System for Synthesizing Texture for a Force-Feedback Display," Ph.D. Dissertation, Massachusetts Institute of Technology, Jun. 1995, 217 pages.
Oakley, I. et al., Contact IM: Exploring Asynchronous Touch over Distance, Palpable Machines Research Group, Media Lab Europe, XP 007910188, at http://people.cs.vt.edu/[wangr06/touch%20review%origization/OAK002, as available via the Internet and printed Oct. 20, 2009.
Rovers, A. et al., HIM: A Framework for Haptic Instant Messaging, CHI 2004 (CHI Conference Proceedings, Human Factors in Computing Systems), XP 002464573, Vienna Austria, Apr. 2004, p. 1313-1316.
Sekiguchi, Y. et al., "Haptic Interface using Estimation of Box Contents Metaphor," Proceedings of ICAT 2003, Tokyo, Japan, XP 002551467, at http://www.vrsj.org/ic-at/papers/2003/00947_00000, as available via the Internet and printed Oct. 20, 2009.
Watanabe, T. et al., "A Method for Controlling Tactile Sensation of Surface Roughness Using Ultrasonic Vibration," IEEE International Conference on Robotics and Automation, 0-7803-1965-6/95, 1995, pp. 1134-1139.
Williamson, J. et al., "Shoogle: Excitatory Multimodal Interaction on Mobile Devices," CHI 2007 Proceedings—Shake, Rattle and Roll: New Forms of Input and Output, 2007, pp. 121-124, XP002549378.
Search Report and Written Opinion dated Jun. 8, 2010 for corresponding PCT Application No. PCT/US2010/026909.
Search Report and Written Opinion dated Jun. 8, 2010 for corresponding PCT Application No. PCT/US2010/026897.
Search Report and Written Opinion dated Jun. 8, 2010 for corresponding PCT Application No. PCT/US2010/026905.
Search Report and Written Opinion dated Jun. 8, 2010 for corresponding PCT Application No. PCT/US2010/026894.
Search Report and Written Opinion dated Jun. 8, 2010 for corresponding PCT Application No. PCT/US2010/026907.
Search Report and Written Opinion dated Jun. 8, 2010 for corresponding PCT Application No. PCT/US2010/026900.
Office Action dated Nov. 2, 2012 for corresponding U.S. Appl. No. 12/947,321.
Chowdhury, M.A. et al., "The Effect of Amplitude of Vibration on the Coefficient of Friction for Different Materials," Tribology International, 2008, 41:307-314.
Tang, H. et al., "A Microfabricated Electrostatic Haptic Display for Persons with Visual Impairments," IEEE Transactions on Rehabilitation Engineering, Sep. 1998, 6(3):241-314.
Office Action dated Nov. 15, 2012 for corresponding U.S. Appl. No. 12/947,532.
Office Action dated Jan. 15, 2013 for corresponding U.S. Appl. No. 12/696,908.
Office Action dated Jan. 15, 2013 for corresponding U.S. Appl. No. 12/697,037.
Office Action dated Jan. 15, 2013 for corresponding U.S. Appl. No. 12/696,900.
Kumazawa, I., Seeking user interface casually used immediately after touched, ITE Technical Report, The Institute of Image Information and Television Engineers, Aug. 29, 2005, vol. 29, No. 46, p. 67-70.
Japanese Patent Office, Decision of Rejection, Application No. JP 2011-554175 dated Mar. 1, 2016.
Japanese Patent Office, Notice of Reasons for Rejection, Application No. JP 2015-020413 dated Mar. 1, 2016.
Japanese Patent Office, Notice of Reasons for Rejection, Application No. JP 2015-019308 dated Feb. 26, 2016.
Japanese Patent Office, Notice of Reasons for Rejection, Application No. JP 2014-171836, dated Nov. 4, 2015.
Japanese Patent Office, Notice of Reasons for Rejection, Application No. JP 2011-554174, dated Jan. 28, 2014.
Korean Patent Office, Notice of Preliminary Rejection, Application No. 10-2011-7023927, dated Sep. 30, 2015.
Korean Patent Office, Notice of Preliminary Rejection, Application No. 10-2011-7023926, dated Sep. 30, 2015.
State Intellectual Property Office of the Peoples Republic of China, Notification of the Second Office Action, Application No. 201080011708 dated Jul. 10, 2014.
State Intellectual Property Office of the Peoples Republic of China, Notification of the Third Office Action, Application No. 201080011708 dated Jan. 26, 2015.
Japanese Patent Office, Office Action, Application No. JP 2015-083829 dated Feb. 16, 2016.
Japanese Patent Office, Notice of Reasons for Rejection, Application No. JP 2011-554180 dated Jan. 7, 2014.
Japanese Patent Office, Decision of Rejection, Application No. JP 2011-554180 dated Dec. 16, 2014.
State Intellectual Property Office of the Peoples Republic of China, Notification of the Second Office Action, Application No. 201080011743 dated Apr. 3, 2014.
State Intellectual Property Office of the Peoples Republic of China, Decision on Rejection, Application No. 201080011743 dated Nov. 3, 2014.
State Intellectual Property Office of the Peoples Republic of China, Notification of the First Office Action, Application No. 201080011744 dated Sep. 23, 2013.
Japanese Patent Office, Notice of Reasons for Rejection, Application No. JP 2011-554172 dated Jan. 28, 2014.
State Intellectual Property Office of the Peoples Republic of China, Notification of the Second Office Action, Application No. 201080011744 dated Jun. 24, 2014.
State Intellectual Property Office of the Peoples Republic of China, Notification of the Third Office Action, Application No. 201080011744 dated Dec. 16, 2014.
State Intellectual Property Office of the Peoples Republic of China, Notification of the Fourth Office Action, Application No. 201080011744 dated Aug. 12, 2015.
Korean Patent Office, Notice of Preliminary Rejection, Application No. 10-2011-7023987 dated Aug. 21, 2015.
Japanese Patent Office, Office Action, Application No. JP 2015-019308 dated Mar. 1, 2016.
United States Patent and Trademark Office, Office Action, U.S. Appl. No. 12/696,893 dated Feb. 29, 2012.
United States Patent and Trademark Office, Office Action, U.S. Appl. No. 12/696,893 dated Sep. 6, 2012.
United States Patent and Trademark Office, Office Action, U.S. Appl. No. 12/696,893 dated Jun. 6, 2013.
United States Patent and Trademark Office, Office Action, U.S. Appl. No. 12/696,893 dated Oct. 22, 2013.
United States Patent and Trademark Office, Office Action, U.S. Appl. No. 12/696,893 dated Mar. 11, 2014.
Meyer, D. et al., Fingertip Friction Modulation due to Electrostatic Attraction, IEEE World Haptics Conference 2013, Apr. 14-18, Korea, pp. 43-48.
Japanese Patent Office, Notice of Reasons for Rejection, Application No. JP2015-083829 dated Jun. 21, 2016.
Korean Patent Office, Notice of Preliminary Rejection, Application No. 10-2011-7023927 dated Jun. 20, 2016.
United States Patent and Trademark Office, Office Action, U.S. Appl. No. 12/696,900 dated Aug. 19, 2016.
United States Patent and Trademark Office, Office Action, U.S. Appl. No. 12/697,042 dated May 17, 2016.
United States Patent and Trademark Office, Office Action, U.S. Appl. No. 12/697,037 dated Jun. 6, 2016.

(56) References Cited

OTHER PUBLICATIONS

United States Patent and Trademark Office, Office Action, U.S. Appl. No. 12/696,900 dated May 9, 2016.
United States Patent and Trademark Office, Office Action, U.S. Appl. No. 12/696,908 dated May 26, 2016.
Korean Patent Office, Notice of Final Rejection, Application No. 10-2011-7023926 dated May 1, 2016.
Korean Patent Office, Notice of Preliminary Rejection, Application No. 10-2016-7024778 dated Oct. 21, 2016.
United States Patent and Trademark Office, Office Action, U.S. Appl. No. 12/696,900 dated Oct. 28, 2016.
United States Patent and Trademark Office, Office Action, U.S. Appl. No. 12/947,532 dated Sep. 9, 2016.
Japanese Patent Office, Final Notice of Rejection, Application No. 2015-083829 dated Nov. 8, 2016.
United States Patent and Trademark Office, Office Action, U.S. Appl. No. 12/696,908 dated Nov. 10, 2016.
United States Patent and Trademark Office, Office Action, U.S. Appl. No. 12/697,042 dated Nov. 30, 2016.
United States Patent and Trademark Office, Office Action, U.S. Appl. No. 12/696,900 dated Dec. 12, 2016.
U.S. Appl. No. 12/947,532, Non Final Office Action dated May 23, 2017.
United States Patent and Trademark Office, Ex Parte Quayle Action, U.S. Appl. No. 12/696,893 dated Mar. 17, 2017.
United States Patent and Trademark Office, Final Rejection, U.S. Appl. No. 12/947,532 dated Feb. 2, 2017.
Korean Patent Office, Final Rejection, Application No. 10-2011-7023926 dated Feb. 3, 2017.
United States Patent and Trademark Office, Final Rejection, U.S. Appl. No. 12/697,037 dated Jan. 17, 2017.
Korean Patent Office Application No. 10-2016-7024778, Office Action and translation dated Apr. 28, 2017.
"2004 UBC CS Technical Report Abstracts," The ICICS/CS Reading Room, pp. 1-5 (Retrieved from http://www.cs.ubc.ca/cgi-bin/tr/2004/full).
Chakrabarti, Satyajit et al., "Rendering Color Information Using Haptic Feedback," University of British Columbia CS Technical Report, TR200410, Jul. 22, 2004 (Retrieved from https://www.cs.ubc.ca/cgi-bin/tr/2004/TR-2004-10.pdf).
European Patent Office Application No. 10712202.0, Office Action dated May 19, 2017.
U.S. Appl. No. 12/696,908, Final Office Action dated Jun. 29, 2017.

* cited by examiner

SYSTEMS AND METHODS FOR A TEXTURE ENGINE

CROSS-REFERENCES TO RELATED APPLICATIONS

This patent application claims priority to U.S. Provisional Patent Application No. 61/159,482, entitled "Locating Features Using a Friction Display," filed Mar. 12, 2009, which is incorporated by reference herein in its entirety.

This patent application claims priority to: U.S. Provisional Patent Application No. 61/262,041, entitled "System and Method for Increasing Haptic Bandwidth in an Electronic Device," filed Nov. 17, 2009, which is incorporated by reference herein in its entirety.

This patent application claims priority to U.S. Provisional Patent Application No. 61/262,038, entitled "Friction Rotary Device for Haptic Feedback," filed Nov. 17, 2009, which is incorporated by reference herein in its entirety.

This patent application is related to U.S. patent application Ser. No. 12/697,042, filed the same day as the present application and entitled "Systems and Methods for Using Multiple Actuators to Realize Textures," which is incorporated by reference herein in its entirety.

This patent application is related to U.S. patent application Ser. No. 12/697,037, filed the same day as the present application and entitled "Systems and Methods for Using Textures in Graphical User Interface Widgets," which is incorporated by reference herein in its entirety.

This patent application is related to U.S. patent application Ser. No. 12/696,893, filed the same day as the present application and entitled "Systems and Methods for Providing Features in a Friction Display," which is incorporated by reference herein in its entirety.

This patent application is related to U.S. patent application Ser. No. 12/696,900, filed the same day as the present application and entitled "Systems and Methods for Friction Displays and Additional Haptic Effects," which is incorporated by reference herein in its entirety.

This patent application is related to U.S. patent application Ser. No. 12/696,908, filed the same day as the present application and entitled "Systems and Methods for Interfaces Featuring Surface-Based Haptic Effects," which is incorporated by reference herein in its entirety.

FIELD OF THE INVENTION

The present invention generally relates to haptic feedback and more particularly to systems and methods for a texture engine.

BACKGROUND

Over the past several years, the use of handheld devices of all types has grown exponentially. These devices are used as portable organizers, telephones, music players, and gaming systems. Many modern handheld devices now incorporate some type of haptic feedback. As haptic technology improves, devices may incorporate haptic feedback simulating a texture. Accordingly, a haptic texture engine is needed.

SUMMARY

Embodiments of the present invention provide systems and methods for a texture engine. For example, in one embodiment, a system for a texture engine comprises: a processor configured to receive a display signal comprising a plurality of pixels, determine a haptic effect comprising a texture, and transmit a haptic signal associated with the haptic effect to an actuator in communication with the processor, the actuator configured to receive the haptic signal and output the haptic effect.

This illustrative embodiment is mentioned not to limit or define the invention, but rather to provide an example to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Embodiments of the present invention provide systems and methods for a texture engine.

Illustrative Embodiment of a Texture Engine

One illustrative embodiment of the present invention comprises a messaging device, such as a mobile phone. In the illustrative embodiment, the messaging device comprises the Samsung Haptic Phone (SCH-W420) equipped with Immersion Corporation's TouchSense® 3000, Touch- Sense® 4000, or TouchSense® 5000 vibrotactile feedback systems, formerly known as Immersion Corporation's Vibe-Tonz® vibrotactile feedback system. In other embodiments, different messaging devices and haptic feedback systems may be utilized.

The illustrative messaging device comprises a display, a speaker, a network interface, a memory, and a processor in communication with each of these elements. The illustrative messaging device also comprises a touch-sensitive interface and an actuator, both of which are in communication with the processor. The touch-sensitive interface is configured to sense a user's interaction with the messaging device, and the actuator is configured to output a haptic effect. The illustrative messaging device may further comprise a manipulandum configured to detect a user interaction and transmit an interface signal associated with the user interaction to the processor.

In the illustrative messaging device, the display is configured to display a graphical user interface to the user. The graphical user interface may comprise virtual objects, for example icons, buttons, or a virtual keyboard. The illustrative messaging device further comprises a touch-sensitive interface, such as a touch-screen, mounted overtop of the display. The touch-sensitive interface allows the user to interact with the virtual objects displayed in the graphical user interface. For example, in one embodiment, the graphical user interface may comprise a virtual keyboard, and in such an embodiment, the touch-sensitive interface allows the user to touch a key on the virtual keyboard to input the alphanumeric character associated with the key. This functionality may be used to type messages, or otherwise interact with objects in the graphical user interface.

In the illustrative messaging device the processor is configured to determine a haptic effect and transmit a haptic signal corresponding to the haptic effect to an actuator configured to output the haptic effect. In the illustrative messaging device, this haptic effect simulates a texture that the user feels on the surface of the touch-sensitive interface. The simulated texture may be associated with the user interface shown on the display. For example, the display may show an icon comprising the shape of a rock. In such an embodiment, the processor may determine a haptic effect configured to simulate the texture of the rock on the surface of the touch-sensitive interface. Then, the processor will transmit a haptic signal to an actuator configured to output the haptic effect. When the actuator receives the haptic signal, it will output a haptic effect, such as a vibration, at a frequency configured to cause the surface of the touch-sensitive interface to approximate the texture of the rock.

In the illustrative embodiment, the processor may implement a haptic map to determine the haptic effect. For example, in the illustrative embodiment, the processor may receive a display signal comprising a plurality of pixels, each of the pixels associated with a color. For example, in the illustrative embodiment, each pixel in the display signal may be associated with the color red, green, or blue, and it may further be associated with an intensity for each color. In the illustrative embodiment, the processor will assign a haptic value to each color and further assign a haptic intensity associated with the intensity of each color. Then, the processor will transmit a haptic signal comprising the haptic values and haptic intensities to an actuator configured to output the haptic effect.

In the illustrative embodiment, the processor may further determine the haptic effect based on an external trigger. For example, in the illustrative embodiment, the processor is configured to receive an interface signal from a touch-sensitive interface configured to detect a user interaction. Then, in the illustrative embodiment, the processor will determine the haptic effect based at least in part on the interface signal. For example, the processor may modify the haptic value or haptic intensity based at least in part on the interface signal. In the illustrative embodiment, if the touch-sensitive interface detects a high speed or high pressure user interaction, the processor will determine a higher intensity haptic effect.

The illustrative messaging device may output a haptic effect for a multitude of purposes. For example, in one embodiment, the haptic effect may act as a confirmation that the processor has received an interface signal associated with a user interaction. For example, the graphical user interface may comprise a button, and the touch-sensitive interface may detect user interaction associated with pressing the button and transmit an interface signal to the processor. In response, the processor may determine a haptic effect to confirm receiving the interface signal. In such an embodiment, the haptic effect may cause the user to feel a texture on the surface of the touch-sensitive interface. In the illustrative embodiment, the processor may further determine haptic effects for other purposes. For example, the illustrative messaging device may output a texture to alert the user to boundaries on the display or as an identification for objects such as icons on the surface of the display.

This illustrative example is given to introduce the reader to the general subject matter discussed herein. The invention is not limited to this example. The following sections describe various additional non-limiting embodiments and examples of systems and methods for a texture engine.

Illustrated System for a Texture Engine

Figure 1:
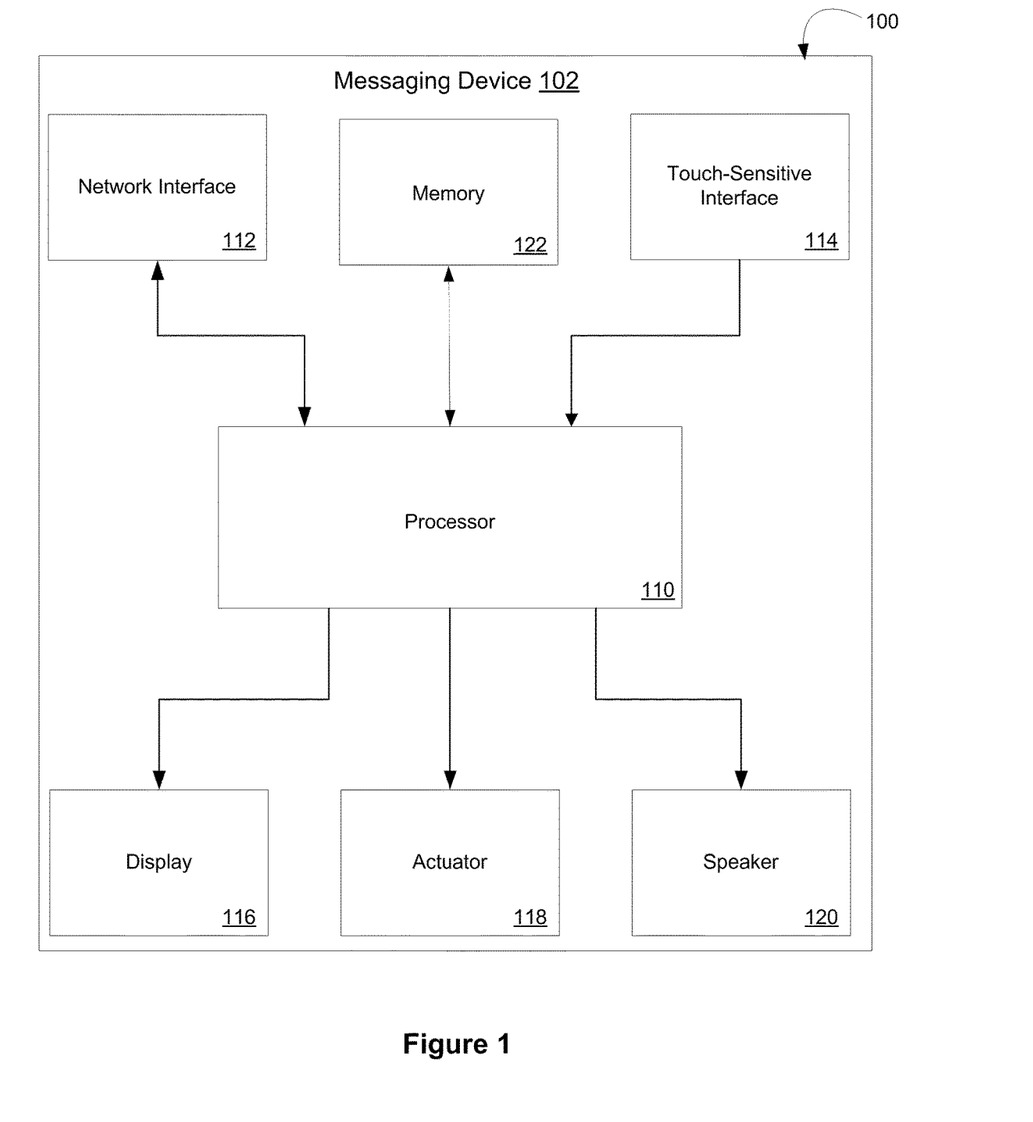
FIG. 1 is a block diagram of a system for a texture engine according to one embodiment of the present invention.

Referring now to the drawings in which like numerals indicate like elements throughout the several figures, FIG. 1 is a block diagram of a system for a texture engine according to one embodiment of the present invention. As shown in FIG. 1, the system 100 comprises a messaging device 102, such as a mobile phone, portable digital assistant (PDA), portable media player, portable computer, portable gaming device, or some other mobile device. In some embodiments, messaging device 102 may comprise a laptop, tablet, desktop PC, or other similar device. In still other embodiments, the messaging device may comprise an external monitor for use with a PC or some other device. The messaging device 102 comprises a processor 110 in communication with a network interface 112, a touch-sensitive interface 114, a display 116, an actuator 118, a speaker 120, and a memory 122.

The processor 110 is configured to execute computer-executable program instructions stored in memory 122. For example, processor 110 may execute one or more computer programs for messaging or for generating haptic feedback. Processor 110 may comprise a microprocessor, a digital signal processor (DSP), an application-specific integrated circuit (ASIC), one or more field programmable gate arrays (FPGAs), or state machines. Processor 110 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or other similar devices.

Memory 122 comprises a computer-readable medium that stores instructions, which when executed by processor 110, cause processor 110 to perform various steps, such as those described herein. Embodiments of computer-readable media may comprise, but are not limited to, an electronic, optical, magnetic, or other storage or transmission devices capable of providing processor 110 with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. In addition, various other devices may include computer-readable media such as a router, private or public network, or other transmission devices. The processor 110 and the processing described may be in one or more structures, and may be dispersed throughout one or more structures.

Processor 110 is in communication with the network interface 112. The network interface 112 may comprise one or more methods of mobile communication, such as infrared, radio, Wi-Fi, or cellular network communication. In other variations, the network interface 112 comprises a wired network interface, such as Ethernet. The messaging device 102 can be configured to exchange messages or virtual message objects with other devices (not shown) over networks such as a cellular network and/or the Internet. Embodiments of messages exchanged between devices may comprise voice messages, text messages, data messages, or other forms of digital messages.

The processor 110 is also in communication with one or more touch-sensitive interfaces 114. In some embodiments, touch-sensitive interface 114 may comprise a touch-screen or a touch-pad. For example, in some embodiments, touch-sensitive interface 114 may comprise a touch-screen mounted overtop of a display configured to receive a display signal and output an image to the user. In other embodiments, touch-sensitive interface 114 may comprise an optical sensor or another type of sensor. In one embodiment, touch-sensitive interface may comprise an LED detector. For example, in one embodiment, touch-sensitive interface 114 may comprise an LED finger detector mounted on the side of display 116. In some embodiments, the processor is in communication with a single touch-sensitive interface 114, in other embodiments, the processor is in communication with a plurality of touch-sensitive interfaces, for example, a first touch-screen and a second touch screen. The touch-sensitive interface 114 is configured to detect user interaction, and based on the user interaction, transmit signals to processor 110. In some embodiments, touch-sensitive interface 114 may be configured to detect multiple aspects of the user interaction. For example, touch-sensitive interface 114 may detect the speed and pressure of a user interaction, and incorporate this information into the interface signal.

In the embodiment shown in FIG. 1, the processor 110 is also in communication with a display 116. The processor 110 can be configured to generate a graphical representation of a user interface to be shown on display 116, then transmit a display signal comprising the graphical representation to display 116. In other embodiments, display 116 is configured to receive a display signal from another device. For example, in some embodiments, display 116 may comprise an external display, such as a computer monitor. Display 116 is configured to receive a display signal and output an image associated with that display signal. In some embodiments, the display signal may comprise a vga, hdmi, svga, video, s-video, or other type of display signal known in the art. In some embodiments, display 116 comprises a flat screen display, such as a Liquid Crystal Display (LCD) or Plasma Screen Display. In other embodiments display 116 comprises a Cathode Ray Tube (CRT) or other type of display known in the art. In still other embodiments, display 116 may comprise touch-sensitive interface 114, for example, display 116 may comprise a touch-screen LCD. In still other embodiments, display 116 may comprise a flexible screen or flexible display. For example, in some embodiments, display 116 may comprise a haptic substrate mounted underneath its surface. In such an embodiment, display 116 is made of a flexible material, and in response to signals received from processor 110, the haptic substrate flexes, forming ridges, troughs, or other features on the surface of display 116. In some embodiments, the haptic substrate may comprise a plasma actuator, a piezoelectric actuator, an electro-active polymer, a micro-electro-mechanical system, a shape memory alloy, a grid of fluid or gas-filled cells.

In some embodiments, processor 110 receives signals from touch-sensitive interface 114 that are associated with an interaction with the graphical user interface shown on display 116. For example, in one embodiment, touch-sensitive interface 114 may comprise a touch-screen and a graphical user interface on display 116 may comprises a virtual keyboard. In such an embodiment, when the user interacts with a section of the touch-screen that overlays one of the keys of the virtual keyboard, the touch-screen will send an interface signal to processor 110 corresponding to that user interaction. Based on the interface signal, processor 110 will determine that the user pressed one of the keys on the virtual keyboard. This functionality allows the user to interact with other icons and virtual objects on the display 116. For example, in some embodiments the user may flick the touch-screen to move a virtual ball or turn a virtual knob.

As shown in FIG. 1, processor 110 is also in communication with an actuation system comprising one or more actuators 118, a suspension system for each actuator, and electrical power and control wiring for each actuator. In some embodiments, messaging device 102 comprises more than one actuation system. Processor 110 is configured to determine a haptic effect and transmit a haptic signal corresponding to the haptic effect to actuator 118. In some embodiments, the haptic effect comprises a vibrotactile texture felt on the surface of display 116, touch-sensitive interface 114, or the housing of messaging device 102. In some embodiments, determining a haptic effect may comprise performing a series of calculations. In other embodiments, determining the haptic effect may comprise accessing a lookup table. In still other embodiments, determining the haptic effect may comprise a combination of lookup tables and algorithms.

In some embodiments, determining the haptic effect may comprise a haptic map. In such an embodiment, determining the haptic effect may comprise mapping the display signal to the actuators. For example, the display signal may comprise a plurality of pixels, each of the pixels associated with a color. In such an embodiment, each pixel may be associated with the color red, green, or blue; each color may further be associated with an intensity, for example, an intensity of 1-8. In such an embodiment, determining the haptic effect may comprise assigning a haptic effect to each color. In some embodiments, the haptic effect may comprise a direction and intensity of operation, for example, in one embodiment the haptic signal may be configured to cause a rotary actuator to rotate clockwise at one-half power. In some embodiments, the intensity of operation may be associated with the intensity of the color. Once processor 110 determines a haptic effect, it transmits a haptic signal comprising the haptic effect. In some embodiments, processor 110 may assign a haptic effect to only some of the pixels in the display signal.

For example, in such an embodiment, the haptic effect may be associated with only a portion of the display signal.

In some embodiments, processor 110 may utilize a haptic map to determine the haptic effect and then output the display signal to display 116. In other embodiments, processor 110 may determine the haptic effect using a haptic map, and then not transmit the display signal to display 116. In such an embodiment, the display 116 may stay dark, or off, while actuator 118 is outputting the haptic effect. For example, in such an embodiment, processor 110 may receive a display signal from a digital camera associated with messaging device 102. In some embodiments, in order to conserve battery power, the user may have deactivated display 116. In such an embodiment, the processor may utilize a haptic map to provide the user with a haptic effect simulating a texture on the surface of the display. This texture may be used to alert the user when the camera is in focus, or when some other event has occurred. For example, processor 110 may use facial recognition software to determine haptic effects simulating textures at locations on display 116 that would be associated with faces if display 116 were activated.

In some embodiments, processor 110 may determine the haptic effect based at least in part on a user interaction or trigger. In such an embodiment, processor 110 receives an interface signal from touch-sensitive interface 114, and determines the haptic effect based at least in part on the interface signal. For example, in some embodiments, processor 110 may determine the haptic effects based on the location of the user interaction detected by touch-sensitive interface 114. For example, in such an embodiment, processor 110 may determine a haptic effect that simulates the texture of a virtual object that the user is touching on the display 116. In other embodiments, processor 110 may determine the intensity of the haptic effect based at least in part on the interface signal. For example, if touch-sensitive interface 114 detects a high pressure user interaction, processor 110 may determine a high intensity haptic effect. In another embodiment, if touch-sensitive interface 114 detects a low pressure user interaction, processor 110 may determine a low intensity haptic effect. In still other embodiments, processor 110 may determine the intensity of the haptic effect based at least in part on the speed of the user interaction. For example, in one embodiment, processor 110 may determine a low intensity haptic effect when touch-sensitive interface 114 detects low speed user interaction. In still other embodiments, processor 110 may determine no haptic effect, unless it receives an interface signal associated with user interaction from touch-sensitive interface 114.

Once processor 110 determines the haptic effect, it transmits a haptic signal associated with the haptic effect to actuator 118. Actuator 118 is configured to receive a haptic signal from processor 110 and generate the haptic effect. Actuator 118 may be, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA). In some embodiments, actuator 118 may comprise a plurality of actuators, for example an ERM and an LRA.

In one embodiment of the present invention, the haptic effect generated by actuator 118 is configured to simulate a texture that the user feels on the surface of touch-sensitive interface 114 or display 116. This texture may be associated with the graphical user interface shown on display 116. For example, display 116 may show an icon comprising the shape of a rock. In such an embodiment, processor 110 may determine a haptic effect configured to simulate the texture of a rock on the surface of touch-sensitive interface 114. Then, processor 110 will transmit a haptic signal associated with the haptic effect to actuator 118, which outputs the haptic effect. For example, when actuator 118 receives the haptic signal, it may output a vibration at a frequency configured to cause the surface of the touch-sensitive interface to comprise the texture of a rock. In other embodiments, actuator 118 may be configured to output a vibration at a frequency that causes the surface of display 116 or touch-sensitive interface 114 to comprise the texture of: water, ice, leather, sand, gravel, snow, skin, fur, or some other surface. In some embodiments, the haptic effect may be output onto a different portion of messaging device 102, for example onto its housing. In some embodiments, actuator 118 may output a multitude of vibrations configured to output multiple textures at the same time. For example, actuator 118 may output a vibration configured to cause the surface of display 116 to comprise the texture of sand. In such an embodiment, actuator 118 may be configured to output additional vibrations, configured to cause the user to feel the texture of rocks in the sand.

Processor 110 may determine a haptic effect for many reasons. For example, in some embodiments, processor 110 may output a haptic effect that corresponds to a the texture of an object shown on display 116. In such an embodiment, the display may show multiple objects, and the processor may determine a different haptic effect as the user moves his/her finger from object to object, thus simulating a different texture for each object. In some embodiments, the haptic effect may act as a confirmation that processor 110 has received a signal associated with user interaction. For example, in one embodiment, the graphical user interface may comprise a button and touch-sensitive interface 114 may detect user interaction associated with pressing the button. When touch-sensitive interface 114 transmits an interface signal associated with the user interaction to processor 110, processor 110 may determine a haptic effect to confirm receipt of the interface signal. In such an embodiment, the haptic effect may cause the user to feel a texture on the surface of touch-sensitive interface 114. For example, the processor may output a haptic effect that simulates the texture of sand to confirm that processor 110 has received the user input. In other embodiments, the processor may determine a different texture, for example, the texture of water, ice, oil, rocks, or skin. In some embodiments, the haptic effect may serve a different purpose, for example, alerting the user of boundaries on display 116, or providing the user with haptic information about the image on display 116. For example, in some embodiments, each icon on display 116 may comprise a different texture and when the user moves his/her finger from one icon to another, the processor will determine a haptic effect that simulates the texture of each icon. In further embodiments, the processor may change the texture when the user's finger moves from contact with an icon to contact with the background of the display, thus alerting the user that he/she is no longer touching the icon.

As shown in FIG. 1, processor 110 is also in communication with speaker 120. Speaker 120 is configured to receive audio signals from processor 110 and output them to the user. In some embodiments, the audio signals may be associated with the haptic effect output by actuator 118, or the image output by display 116. In other embodiments, the audio signal may not correspond to the haptic effect or the image.

In some embodiments, processor 110 may further comprise one or more sensors, for example, a GPS sensor, an imaging sensor, accelerometer, location sensor, rotary velocity sensor, light sensor, camera, microphone, or some other type of sensor. The sensor may be configured to detect changes in acceleration, inclination, inertia, or location. For example, messaging device 102 may comprise an accelerometer configured to measure the messaging device's acceleration. The sensor is configured to transmit sensor signals to processor 110.

The sensor signals may comprise one or more parameters associated with a position, a movement, an acceleration, or a "jerk" (i.e. the derivative of acceleration) of the messaging device 102. For example, in one embodiment, the sensor may generate and transmit a sensor signal comprising a plurality of parameters, each parameter associated with a movement along or about one measured translational or rotational axis. In some embodiments, the sensor outputs voltages or currents that processor 110 is programmed to interpret to indicate movement along one or more axes.

In some embodiments, processor 110 will receive the sensor signal and determine that it should activate a virtual workspace and interpret sensed movement of the messaging device 102 in an X, Y, or Z direction as corresponding to a virtual movement "within" the virtual workspace. The user may then move device 102 within the virtual workspace to select functions or files, by gesturing within the virtual space. For example, by moving the messaging device 102 in the Z-Axis overtop of a function within the virtual workspace. In some embodiments, the user may use gestures within the virtual workspace to modify the haptic effects output by messaging device 102.

Figure 2:
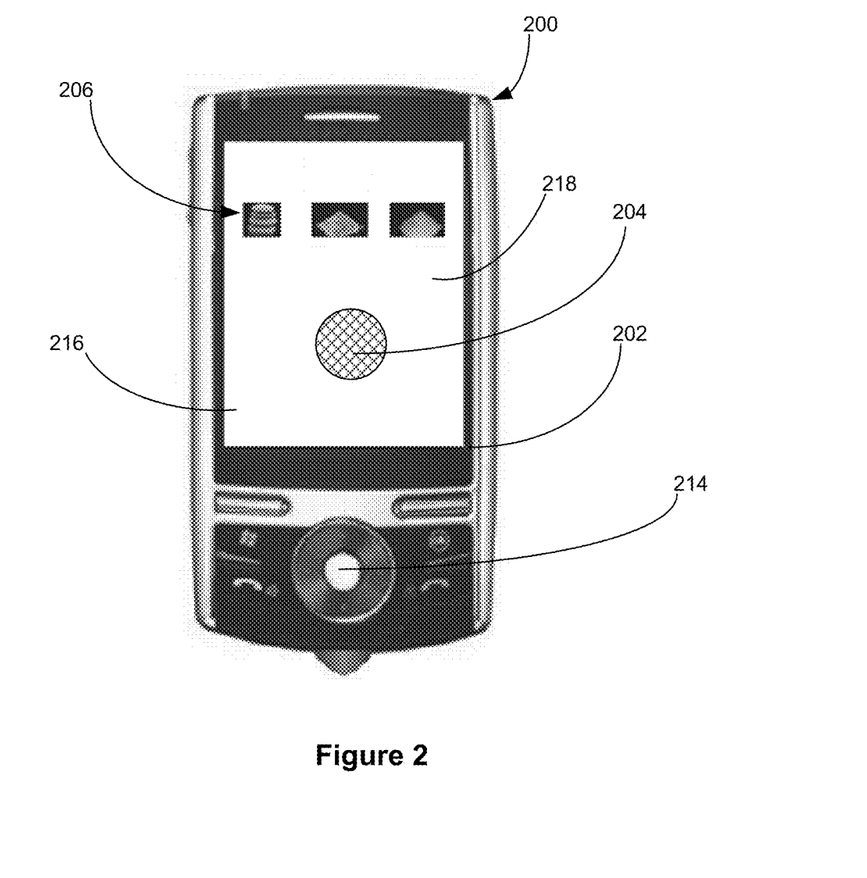
FIG. 2 is an illustration of a system for a texture engine according to one embodiment of the present invention.

FIG. 2 is an illustration of a system for a texture engine according to one embodiment of the present invention. FIG. 2 comprises a messaging device 200, such as a mobile phone, PDA, portable media player, portable gaming device, or mobile computer. The messaging device 200 is configured to send and receive signals, such as voicemail, text messages, and other data messages, over a network such as a cellular network or the Internet. The messaging device 200 may comprise a wireless network interface and/or a wired network interface (not shown in FIG. 2). Although the device 200 is illustrated as a handheld messaging device in FIG. 2, other embodiments may comprise different devices, such as video game systems and/or personal computers.

As shown in FIG. 2, the messaging device 200 comprises a housing 202 and a display 216. In some embodiments, display 216 may comprise an LCD display. In other embodiments, display 216 may comprise a plasma display, or other type of display known in the art. Display 216 is configured to receive a display signal and output an image associated with that display signal. In some embodiments, the display signal may comprise a vga, hdmi, svga, video, s-video, or other type of display signal known in the art. In the embodiment shown in FIG. 2, display 216 comprises a textured ball 204. Display 216 further comprises texture selection icons 206, which comprise the textures of rocks, sand, and water.

Referring still to FIG. 2, the messaging device 200 further comprises a manipulandum 214. In the embodiment shown in FIG. 2, the manipulandum 214 comprises a roller ball and buttons. The messaging device 200 also comprises a touch-sensitive interface 218. In the embodiment shown in FIG. 2, touch-sensitive interface 218 comprises a touch-screen positioned overtop of display 216. In some embodiments, display 216 and the touch-screen may comprise a single integrated component, such as a touch-screen display.

Manipulandum 214 and touch-sensitive interface 218 are configured to detect user interaction and transmit interface signals corresponding to the user interaction to the processor. In some embodiments, the user interaction is associated with a graphical user interface shown on display 216. In such an embodiment, the processor receives the interface signal and, based at least in part on the interface signal, manipulates the graphical user interface. For example, in the embodiment shown in FIG. 2, the user may use either manipulandum 214 or touch-sensitive interface 218 to select one of texture selection icons 206. Once the user has selected a texture for textured ball 204, its appearance on the screen may change to correspond to that texture. For example, if the user selects the sand texture icon, the processor may manipulate the display to give textured ball 204 the appearance of a sandy surface, and further determine a haptic effect that causes the user to feel a sandy texture when interacting with textured ball 204. Or, in another embodiment, if the user selects the rocky texture icon, the processor may determine a haptic effect that causes the user to feel a rocky texture when the user interacts with textured ball 204.

Messaging device 200 further comprises an actuator configured to receive a haptic signal and output a haptic effect (not shown in FIG. 2). In some embodiments, the haptic effect comprises a vibrotactile texture felt by the user of messaging device 200. Processor 110 is configured to determine a haptic effect and transmit a haptic signal corresponding to the haptic effect to the actuator. In some embodiments, determining a haptic effect may comprise a series of calculations to determine the haptic effect. In other embodiments, determining the haptic effect may comprise accessing a lookup table to determine the appropriate haptic effect. In still other embodiments, determining the haptic effect may comprise using a combination of lookup tables and algorithms. Once processor 110 determines the haptic effect, it transmits a haptic signal associated with the haptic effect to the actuator. The actuator receives the haptic signal from processor 110 and generates the haptic effect. The user may feel the haptic effect via the surface of display 216 or through some other part of messaging device 200, for example via manipulandum 214 or housing 202. In some embodiments, the processor may modify this haptic effect as the user moves his/her finger over the surface of textured ball 204, in order to simulate changes in texture.

Illustrations of Systems for a Texture Engine

Figure 3A:
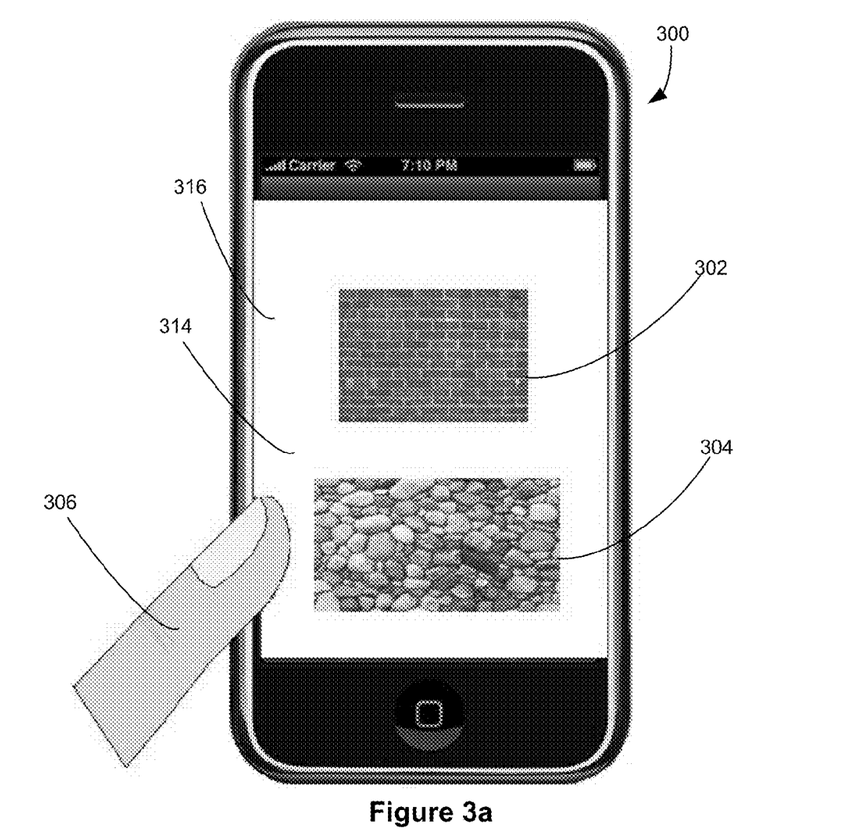
FIG. 3a is an illustration of a system for a texture engine according to one embodiment of the present invention.

FIG. 3a is an illustration of a system for a texture engine according to one embodiment of the present invention. FIG. 3a comprises a messaging device 300, such as a mobile phone, PDA, portable media player, portable gaming device, or mobile computer. The messaging device 300 is configured to send and receive signals comprising messages, such as voicemail, text messages, and other data messages, over a network such as a cellular network or the Internet. The messaging device 300 may comprise a wireless network interface and/or a wired network interface (not shown in FIG. 3a). Although the device 300 is illustrated as a handheld messaging device in FIG. 3a, other embodiments may comprise different devices, such as video game systems and/or personal computers.

As shown in FIG. 3a, messaging device 300 comprises a display 316. Display 316 is configured to receive a display signal, and output an image based at least in part on the display signal. Messaging device 300 further compromises a processor (not shown in FIG. 3a) configured to transmit the display signal to display 316. Messaging device 300 further comprises a touch-sensitive interface 314 mounted overtop of display 316. Touch-sensitive interface 314 is configured to detect a user interaction and transmit an interface signal corresponding to the user interaction to the processor. Display 316 comprises two icons 302 and 304. When the user interacts with one of icons 302 and 304, touch-sensitive interface 314 will detect the user interaction and transmit a corresponding interface signal to the processor. Based on this interface signal, the processor may determine that the user has opened a file linked to one of the icons or performed some other action known in the art.

As shown in FIG. 3a, each of icons 302 and 304 comprises a texture. In the embodiment shown, icon 302 comprises the texture of bricks and icon 304 comprises the texture of rocks. In other embodiments, different textures may be used, for example, the texture of sand, water, oil, grass, fur, skin, leather, ice, wood, or some other texture known in the art. When the user, shown in FIG. 3a as finger 306, interacts with the section of display 316 associated with each icon, the processor will determine a haptic effect configured to simulate the texture of that icon. The processor will then output a signal associated with the haptic effect to an actuator (not shown in FIG. 3a) configured to output the haptic effect. For example, in the embodiment shown in FIG. 3a, when the user interacts with the section of display 316 associated with the icon 302 the processor will determine a haptic effect associated with the texture of bricks. This haptic effect may be characterized by a random signal punctuated with high powered pulses as user's finger 306 moves across mortar. In other embodiments, other haptic effects will be used to simulate different textures that may correspond to the image shown on display 316.

Figure 3B:
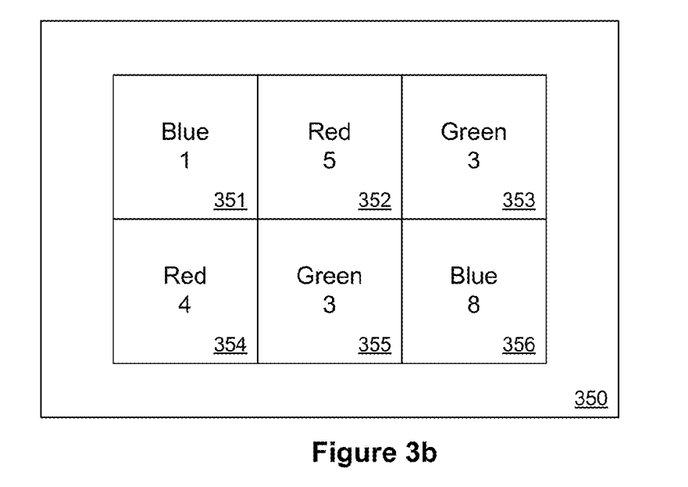
FIG. 3b is an illustration of a system for a texture engine according to one embodiment of the present invention.

FIG. 3b is an illustration of a system for a texture engine according to one embodiment of the present invention. In the embodiment shown in FIG. 3b, determining the haptic effect comprises mapping the display signal to the actuator. The embodiment shown in FIG. 3b, comprises a magnified section of a display 350. Display 350 is configured to receive a display signal from the processor. The display signal comprises a plurality of pixels that are each associated with a color and an intensity of that color. Display 350 receives this display signal and outputs an image associated with the display signal. In the embodiment shown in FIG. 3b, the magnified portion of display 350 comprises six pixels: 351, 352, 353, 354, 355, and 356. Each pixel is associated with a color and an intensity for that color ranging from 1-10. For example, pixel 355 is associated with the color green, and the color intensity 3 out of 10. Thus, the display 350 will output the color green at an intensity of 3 at the location of pixel 355.

In the embodiment shown in FIG. 3b, the processor will determine the haptic effect based, at least in part, on the display signal and an interface signal received from a touch-sensitive interface mounted overtop of display 350 (not shown in FIG. 3b). For example, in the embodiment shown in FIG. 3b, the processor uses the display signal to associate, or "map," a haptic effect with each pixel. For example, in the embodiment shown in FIG. 3b, the processor may determine a different frequency haptic effect for each color. The processor may further associate the intensity of the haptic effect at each pixel with the intensity of the color at each pixel. For example, the processor may determine that a pixel with a color intensity of 8 will also have a haptic intensity of 8. When the processor receives an interface signal associated with user interaction overtop of the pixels on the display, the processor will output a haptic signal associated with the pixels the user is interacting with. This haptic effect is configured to cause the user to feel a texture on the surface of the display.

For example, in the embodiment shown in FIG. 3b, the processor may determine blue pixels are associated with a knocking haptic effect, red pixels are associated with a pulsing vibration, and green pixels are associated with a clicking haptic effect. In such an embodiment, when the touch-sensitive interface detects that the user's finger has passed over pixel 351, the processor will determine a knocking with an intensity of 1. Then as the user's finger moves over pixel 352, the processor will determine a pulsing vibration with an intensity of 5. And, as the user's finger continues to move across display 350 to pixel 353, the processor may determine a clicking effect with an intensity of 3.

These haptic effects are configured to cause the user to feel a texture on the surface of display 350 as the user moves his/her finger over the surface of display 350. In some embodiments, the processor may be in communication with more than one actuator, and each color may be associated with its own actuator. In other embodiments, different combinations of colors, intensities, and haptic effects may be used to cause the user to feel a texture on the surface of the display.

Figure 4:
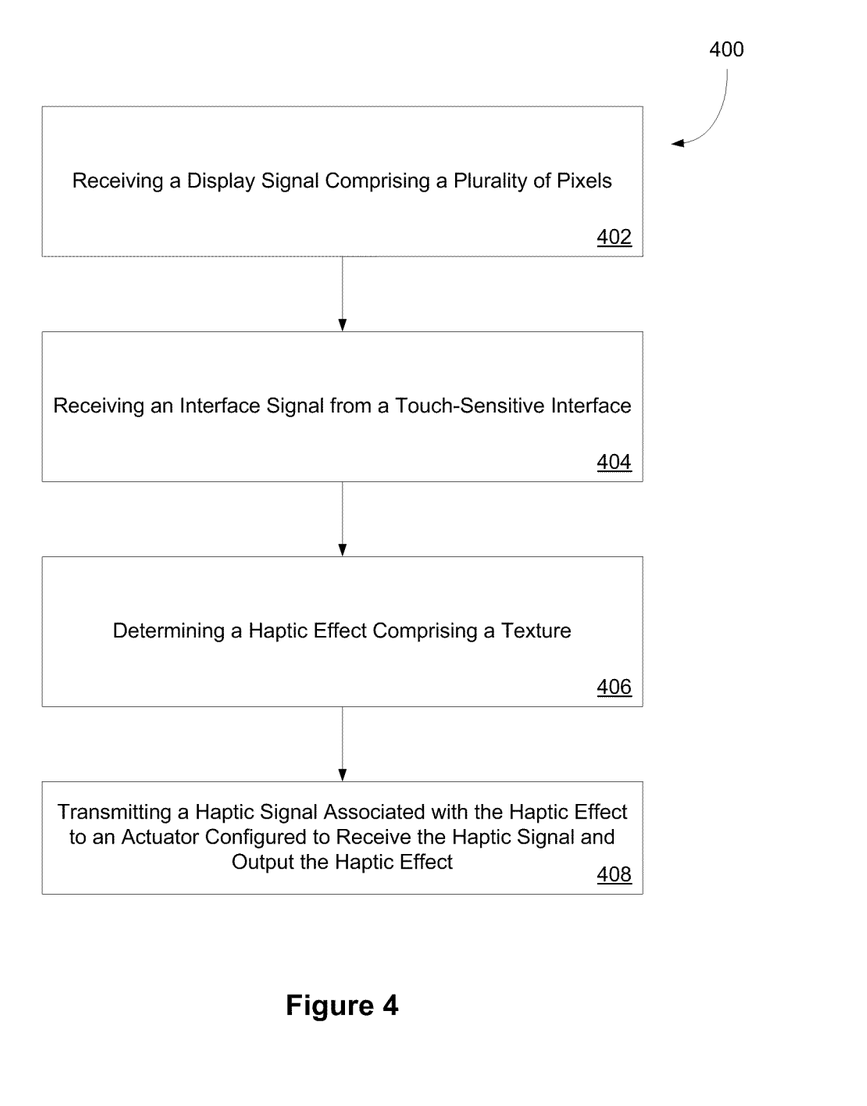
FIG. 4 is a flow chart of a method for a texture engine according to one embodiment of the present invention.

FIG. 4 is a flow chart of a method for a texture engine according to one embodiment of the present invention, which is discussed with respect to the device shown in FIG. 1. As shown in FIG. 4, the method 400 begins when processor 110 receives a display signal comprising a plurality of pixels 402. The display signal may comprise a vga, hdmi, svga, video, s-video, or other type of display signal known in the art. The display signal may comprise a graphical user interface, or other image that the messaging device will display to the user via display 116.

Then, touch-sensitive interface 114 transmits an interface signal to processor 110, which receives the interface signal 404. In some embodiments, touch-sensitive interface 114 may comprise a touch-screen or a touch-pad. For example, in some embodiments, touch-sensitive interface 114 may comprise a touch-screen mounted overtop of a display configured to receive a display signal and output an image to the user. In other embodiments, the touch-sensitive interface may comprise a button, switch, scroll wheel, roller ball, or some other type of physical device interface known in the art. In some embodiments, processor 110 is in communication with a single touch-sensitive interface 114. In other embodiments, processor 110 is in communication with a plurality of touch-sensitive interfaces 114, for example, a touch-screen and a roller ball. Touch-sensitive interface 114 is configured to detect user interaction, and based at least in part on the user interaction, transmit signals to the processor. In some embodiments, touch-sensitive interface 114 may be configured to detect multiple aspects of the user interaction. For example, touch-sensitive interface 114 may detect the speed and pressure of a user interaction and incorporate this information into the interface signal.

Next, processor 110 determines a haptic effect comprising a texture 406. The haptic effect may comprise a vibration that the user may feel through the surface of a touch-sensitive interface or a manipulandum. In some embodiments, this vibration may cause the user to feel a texture on the surface of the touch-sensitive interface. For example, the texture of leather, snow, sand, ice, skin, or some other surface. In some embodiments, determining a haptic effect may comprise a series of calculations to determine the haptic effect. In other embodiments, determining the haptic effect may comprise accessing a lookup table to determine the appropriate haptic effect. In still other embodiments, determining the haptic effect may comprise a combination of lookup tables and algorithms.

In some embodiments, determining the haptic effect may comprise a haptic map. In such an embodiment, determining the haptic effect may comprise mapping the display signal to the actuators. For example, the display signal may comprise a plurality of pixels, each of the pixels associated with a color. In such an embodiment, determining the haptic effect may comprise assigning a haptic effect to each color. Then processor 110 will output a haptic signal comprising the haptic effect. In some embodiments, processor 110 may assign a haptic effect to only some of the pixels in the display signal. For example, in such an embodiment, the haptic effect may be associated with only a portion of the display signal.

In some embodiments, processor 110 may determine the haptic effect based, at least in part, on a user interaction or trigger. In such an embodiment, processor 110 receives an interface signal from touch-sensitive interface 114, and determines the haptic effect based at least in part on the interface signal. For example, in some embodiments, processor 110 may determine different intensity haptic effects based on the interface signal received from touch-sensitive interface 114. For example, if touch-sensitive interface 114 detects a high pressure user interaction, processor 110 may determine a high intensity haptic effect. In another embodiment, if touch-sensitive interface 114 detects a low pressure user interaction, processor 110 may determine a low intensity haptic effect. In still other embodiments, processor 110 may determine a low intensity haptic effect when touch-sensitive interface 114 detects low speed user interaction. Further, processor 110 may determine high intensity haptic effects when touch-sensitive interface 114 detects a high speed user interaction. In still other embodiments, processor 110 may determine no haptic effect, unless it receives an interface signal comprising a user interaction from touch-sensitive interface 114.

Finally, processor 110 transmits a haptic signal associated with the haptic effect to actuator 118, which is configured to receive the haptic signal and output the haptic effect 408. Actuator 118 is configured to receive a haptic signal from processor 110 and generate the haptic effect. Actuator 118 may be, for example, a piezoelectric actuator, an electric motor, an electro-magnetic actuator, a voice coil, a linear resonant actuator, a shape memory alloy, an electro-active polymer, a solenoid, an eccentric rotating mass motor (ERM), or a linear resonant actuator (LRA).

Figure 5A:
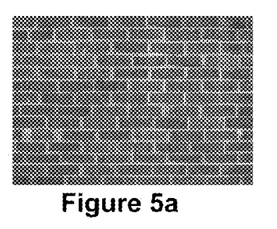
FIG. 5a is an illustration of one of the textures that a texture engine may generate according to one embodiment of the present invention.

FIG. 5a is an illustration of one of the textures that a texture engine may generate according to one embodiment of the present invention. The embodiment shown in FIG. 5a comprises brick. The texture of brick is characterized by having a rough irregular texture from bricks, punctuated with the feel of gritty valleys from the mortar. A system for a texture engine may generate the rough irregular texture of brick by driving an actuator, such as a LRA, LPA, or FPA, with a random signal with medium to high maximum variance while the user's finger is moving. In some embodiments, this variance may be adjusted for different roughness. In some embodiments, the transition from brick to mortar may be rendered by a high duration pop created by an ERM. Additionally, if the mortar is thick enough, a fine texture may be rendered by driving an actuator with a lower magnitude signal with a higher variance than that used to drive the actuator outputting the texture of the brick.

Figure 5B:
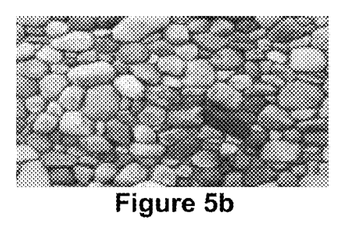
FIG. 5b is another illustration of one of the textures that a texture engine may generate according to one embodiment of the present invention.

FIG. 5b is an illustration of one of the textures that a texture engine may generate according to one embodiment of the present invention. The embodiment shown in FIG. 5b comprises rocks. The texture of rocks is characterized by smooth surfaces punctuated with transitions as the user moves from rock to rock. In order to output the texture of a rock, an actuator, such as an FPA, is used to create patches of low friction. Individual rocks may be rendered by a non-visual edge map of the displayed image, and outputting a high magnitude haptic signal to an actuator, such as an LPA or ERM, when the touch-sensitive interface detects the user's movement. For example, outputting the haptic effect whenever the touch-sensitive interface detects that the user's finger is transitioning from one rock to another.

Figure 5C:
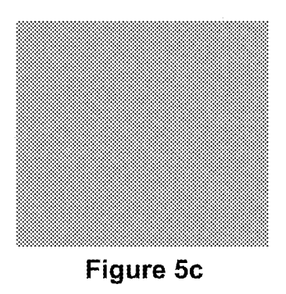
FIG. 5c is another illustration of one of the textures that a texture engine may generate according to one embodiment of the present invention.

FIG. 5c is an illustration of one of the textures that a texture engine may generate according to one embodiment of the present invention. The embodiment shown in FIG. 5c comprises sand or sandpaper. Sand is characterized by a rough, gritty feel as well as the sensation a pile of sand particles building up in front of the user's finger. In order to output the rough gritty texture, of sand, an actuator, such as an LRA, LPA or FPA is driven with a random signal with high maximum variance while the user's finger is moving. In some embodiments, the processor may adjust the variance of the signal to create different degrees of roughness. To create the feeling of sand piling up, an actuator such as an FPA may be used. In such an embodiment, when user moves their finger across the touch screen, the processor will drive the actuator with a signal that starts with a low intensity and builds as the user moves his/her finger in one direction.

In another embodiment, the texture shown in FIG. 5c may comprise sandpaper. Sandpaper is characterized by having a rough, gritty feel. To create the rough, gritty feel the processor drives an actuator, such as an LRA, LPA or FPA with a random signal with high maximum variance. In some embodiments, this signal is output only while the user's finger is moving across the surface the touch-sensitive interface. In some embodiments, the processor may adjust the variance of the signal to change the level of roughness.

Figure 5D:
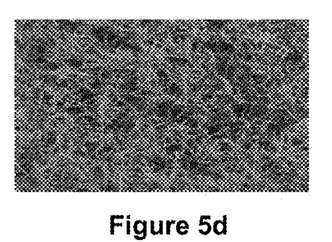
FIG. 5d is another illustration of one of the textures that a texture engine may generate according to one embodiment of the present invention.

FIG. 5d is an illustration of one of the textures that a texture engine may generate according to one embodiment of the present invention. In the embodiment shown in FIG. 5c, the texture comprises the texture of grass. Grass is characterized by a periodic light sensation that almost tickles the user's finger. In order to create the sensation of grass, the processor may drive an actuator, such as an FPA, with a signal configured to create patches of low friction overlaid with patches of grass. In some embodiments, the processor may render individual grass blades by having a non-visual edge map of the displayed image and outputting a low magnitude signal to an actuator, such as an LPA or ERM, when the user interface detects the user interaction.

Figure 5E:
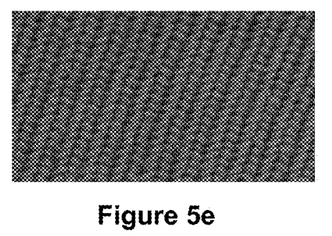
FIG. 5e is another illustration of one of the textures that a texture engine may generate according to one embodiment of the present invention.

FIG. 5e is an illustration of one of the textures that a texture engine may generate according to one embodiment of the present invention. In the embodiment shown in FIG. 5e, the texture comprises the texture of fabric. Fabric is characterized by a light smooth sensation. In order to create the sensation of the texture of fabric, the processor may drive an actuator, such as an LPA or an LRA with low magnitude high frequency signals, as the user's finger moves across the surface of the touch-sensitive interface.

Figure 5F:
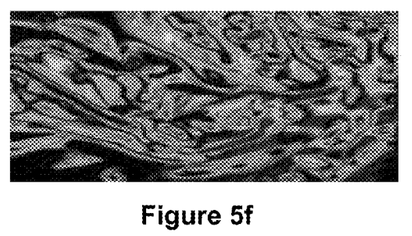
FIG. 5f is another illustration of one of the textures that a texture engine may generate according to one embodiment of the present invention.

FIG. 5f is an illustration of one of the textures that a texture engine may generate according to one embodiment of the present invention. In the embodiment shown in FIG. 5f, the texture comprises the texture of water or molasses. Water is characterized by having almost no sensation. However, water that is disturbed may splash around and hit against the user's finger. To emulate the texture of water, the processor may drive an actuator such as an FPA to reduce the friction on the surface of the touch-sensitive interface. To emulate the water sloshing, the processor may output the haptic signal only when the user is touching the screen. To emulate the texture of a more viscous fluid, such as molasses, or oil, the processor may drive the actuator with a signal configured to increase the friction on the user's finger as it moves across the surface of the touch-sensitive interface.

Figure 5G:
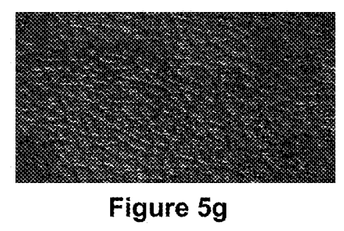
FIG. 5g is another illustration of one of the textures that a texture engine may generate according to one embodiment of the present invention.
Figure 5H:
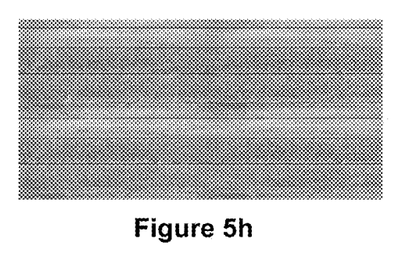
FIG. 5h is another illustration of one of the textures that a texture engine may generate according to one embodiment of the present invention.

FIG. 5g is an illustration of one of the textures that a texture engine may generate according to one embodiment of the present invention. In the embodiment shown in FIG. 5g, the texture comprises the texture of leather. Leather is characterized by an overall smooth feeling that comprises the bumps and valleys of the surface of the leather. In order to create the sensations of the texture of leather, the processor may drive an actuator, such as an FPA, with a signal configured to output a haptic effect that reduces friction as the user's finger moves across the surface of the touch-sensitive interface. The processor can output the cracks and bumps by driving the actuator with a very short low magnitude haptic signal at times when the touch-sensitive interface detects that the user's finger is moving.

FIG. 5g is an illustration of one of the textures that a texture engine may generate according to one embodiment of the present invention. In the embodiment shown in FIG. 5e, the texture comprises the texture of wood. Wood may be characterized by an irregular bumpy texture punctuated by a sharp transition as the user moves from board to board. In order to create the irregular bumpy texture, the processor may drive an actuator such as an LRA, LPA, or FPA with a non-visual edge map of the displayed image and drive the actuator with a very short low magnitude signal at various times when the user's finger is moving. To output the transition from plank to plank, the processor may output a haptic signal configured to cause the actuator to generate a high magnitude, short duration, pop.

In other embodiments, haptic effects associated with different textures may be output. For example, in one embodiment, the processor may transmit a haptic signal configured to cause the actuator to output a haptic effect configured to cause the user to feel a texture associated with the texture of ice. Ice is characterized by low friction, in some embodiments; ice has a completely smooth texture. In other embodiments, ice comprises a fine low magnitude gritty texture. In order to create the texture of ice, the processor may determine a haptic signal configured to cause the actuator to reduce the friction as much as possible while the user moves their finger across the surface of the touch-sensitive interface. In another embodiment, the processor may drive an actuator, such as an LPA or LRA, with a haptic signal configured to output low magnitude effects while the user moves their finger. These low magnitude effects may be associated with imperfections or grit on the surface of the ice.

In another embodiment, the processor may drive the actuator with a signal configured to cause the actuator to output a haptic effect approximating the texture of lizard skin. Lizard skin is characterized by an overall smooth sensation punctuated by transitions from bump to bump on the skin. In order to implement a haptic effect comprising the texture of lizard skin, the processor may drive an actuator with a haptic signal configured to cause the actuator to create patches of low friction on the touch-sensitive interface. The processor may render cracks on the surface of the skin by outputting high magnitude haptic signals periodically, when the touch-sensitive interface detects that the user's finger is moving across its surface. These high magnitude signals may approximate the cracks in the surface of the skin.

In yet another embodiment, the processor may drive the actuator with a signal configured to cause the actuator to output a haptic effect approximating the texture of fur. Fur is characterized by a periodic light sensation that is very soft to the touch. In order to implement a haptic effect comprising the texture of fur, the processor may drive the actuator with a haptic signal configured to cause the actuator to output a haptic effect configured to reduce the friction the user feels on the surface of the touch-sensitive interface. The processor may further render individual hairs outputting a low magnitude pulsing haptic signals as the touch-sensitive interface detects the user's movement.

In yet another embodiment, the processor may drive the actuator with a signal configured to cause the actuator to output a haptic effect approximating the texture of metal. Metal is characterized by a smooth low friction surface that, in some embodiments, includes light grit. In order to implement a haptic effect comprising the texture of metal, the processor may drive the actuator with a signal configured to lower the friction the user feels on the surface of the touch-sensitive interface. In some embodiments, the processor may render individual bumps by outputting brief high magnitude haptic signals when the touch-sensitive interface detects that the user is moving over its surface. These brief high magnitude signals may approximate grit on the surface of the metal.

In yet another embodiments, the processor may drive the actuator with a signal configured to cause the actuator to output a haptic effect approximating another sensation, for example, heat. In such an embodiment, the processor may output a haptic signal configured to cause the actuator to output a high frequency jolting effect, when the user touches elements of the display that are associated with heat.

Advantages of Systems and Methods for a Texture Engine

There are many advantages of systems and methods for a texture engine. For example, systems and methods of a texture engine adds a previously unused haptic effect to a mobile device. This new effect provides a new avenue for the user to receive information from the mobile device, without the user having to look at the display of the mobile device. For example, systems and methods of a texture engine may allow the user to assign different textures to different icons, buttons, or other components of their display. Thus, the user may be able to determine which icon they are touching, without having to look at that icon. This may increase usability of the device, and may make a device more useful to the visually impaired.

Further, because systems and methods for a texture engine provides the user with more information, without distracting the user from other tasks, it will reduce user error. For example, users will be less likely to hit the wrong icon or press the wrong key if they are utilizing systems and methods for a texture engine. This functionality may serve both to increase user satisfaction and increase the adoption rate for technology that incorporates systems and methods for a texture engine.

General Considerations

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed is:

1. A system comprising: a processor configured to:
receive a display signal comprising a plurality of pixels, wherein each of the plurality of pixels is associated with a color and an intensity of the color;
assign a haptic value to each color;
receive a sensor signal from a sensor configured to detect movement of a mobile device in the X, Y, or Z direction;
determine a haptic effect comprising a texture, wherein determining the haptic effect comprises determining the haptic value associated with one or more of the plurality of pixels, and wherein determining the haptic effect further comprises determining the haptic effect based in part on the movement; and
transmit a haptic signal associated with the haptic effect;
an actuator in communication with the processor, the actuator configured to receive the haptic signal and output the haptic effect, wherein the haptic signal comprises a direction of operation and an intensity of operation for the actuator, wherein the direction of operation is based in part on the color and the intensity of operation is based in part on the intensity of the color; and
a display in communication with the processor, the display configured to receive the display signal and output an image, wherein the texture is output onto a surface of the display.

2. The system of claim 1, wherein the texture is vibrotactile effect.

3. The system of claim 1, wherein the texture comprises the texture of one or more of: sand, lizard skin, or a brick.

4. The system of claim 1, wherein the actuator comprises one or more of: an eccentric rotating mass motor, a linear resonant actuator, a shape memory alloy, an electroactive polymer, or a piezoelectric actuator.

5. The system of claim 1, wherein each color comprises an intensity, and determining the haptic effect further comprises adjusting the haptic value to correspond to the intensity.

6. The system of claim 1, wherein the actuator is coupled to the display.

7. The system of claim 1, further comprising a housing configured to enclose the actuator and the processor.

8. The system of claim 7, wherein the housing comprises a mobile device housing.

9. The system of claim 7, wherein the actuator is coupled to the housing.

10. The system of claim 9, wherein the movement of the mobile device corresponds to a movement in a virtual workspace.

11. The system of claim 1, further comprising a touch-sensitive interface configured to detect user interaction and transmit a sensor signal to the processor based at least in part on the user interaction.

12. The system of claim 11, wherein the processor is further configured to determine the haptic effect based at least in part on the sensor signal.

13. The system of claim 12, wherein the touch-sensitive interface is configured to detect a speed of the user interaction and wherein determining the haptic effect comprises adjusting the haptic effect to correspond with the speed of the user interaction.

14. The system of claim 12, wherein the touch-sensitive interface is configured to detect a pressure of the user interaction and wherein determining the haptic effect comprises adjusting the intensity of the haptic effect to correspond with the pressure of the user interaction.

15. A method for outputting a haptic effect comprising:
receiving a display signal comprising a plurality of pixels, wherein each of the plurality of pixels is associated with a color and an intensity of the color;
assigning a haptic value to each color;
receiving a sensor signal from a sensor configured to detect movement of a mobile device in the X, Y, or Z direction;
determining a haptic effect comprising a texture, wherein determining the haptic effect comprises determining the haptic value associated with one or more of the plurality of pixels, and wherein determining the haptic effect further comprises determining the haptic effect based in part on the movement;
transmitting a haptic signal associated with the haptic effect to an actuator configured to receive the haptic signal and output the haptic effect, wherein the haptic signal comprises a direction of operation and an intensity of operation for the actuator, wherein the direction of operation is based in part on the color and the intensity of operation is based in part on the intensity of the color; and
outputting the display signal to a display configured to receive the display signal and output an image, wherein the texture is output onto a surface of the display.

16. The method of claim 15, wherein each color comprises an intensity and determining the haptic effect further comprises adjusting the haptic value to correspond to the intensity.

17. The method of claim 15, further comprising receiving an interface signal from a touch-sensitive interface, and wherein the haptic effect is determined based at least in part on the interface signal.

18. A system comprising:
a touch-sensitive interface configured to detect a user interaction and transmit a signal corresponding to the user interaction, the touch-sensitive interface configured to detect the a speed and pressure of the user interaction;
a processor in communication with the touch-sensitive interface, the processor configured to:
receive a display signal comprising a plurality of pixels that each comprise a color and an intensity of the color;
assign a haptic value to each color;
receive a sensor signal from a sensor configured to detect movement of a mobile device in the X, Y, or Z direction;
determine a haptic effect comprising a texture, wherein determining the haptic effect comprises determining the haptic value associated with one or more of the plurality of pixels, and wherein determining the haptic effect further comprises determining the haptic effect based in part on the movement; and
transmit a haptic signal associated with the haptic effect;
an actuator in communication with the processor, the actuator configured to receive the haptic signal and output the haptic effect, wherein the haptic signal comprises a direction of operation and an intensity of operation for the actuator, wherein the direction of operation is based in part on the color and the intensity of operation is based in part on the intensity of the color; and
a display in communication with the processor, the display configured to receive the display signal and output an image, where in the texture is output onto a surface of the display.

19. The system of claim 18 further comprising a sensor configured to detect a movement of a mobile device in the X, Y, or Z direction, and wherein the processor is further configured to determine the haptic effect based in part on the movement.

20. The system of claim 18, wherein the movement of the mobile device corresponds to a movement in a virtual workspace.

* * * * *

UNITED STATES PATENT AND TRADEMARK OFFICE
CERTIFICATE OF CORRECTION

PATENT NO. : 9,874,935 B2  
APPLICATION NO. : 12/697010  
DATED : January 23, 2018  
INVENTOR(S) : Cruz-Hernandez et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 677 days.

Signed and Sealed this
Nineteenth Day of June, 2018

Andrei Iancu
*Director of the United States Patent and Trademark Office*